July 4, 1961
D. RAMAKER
2,990,888
PROPELLER CONTROL APPARATUS
Filed Dec. 27, 1957
2 Sheets-Sheet 2
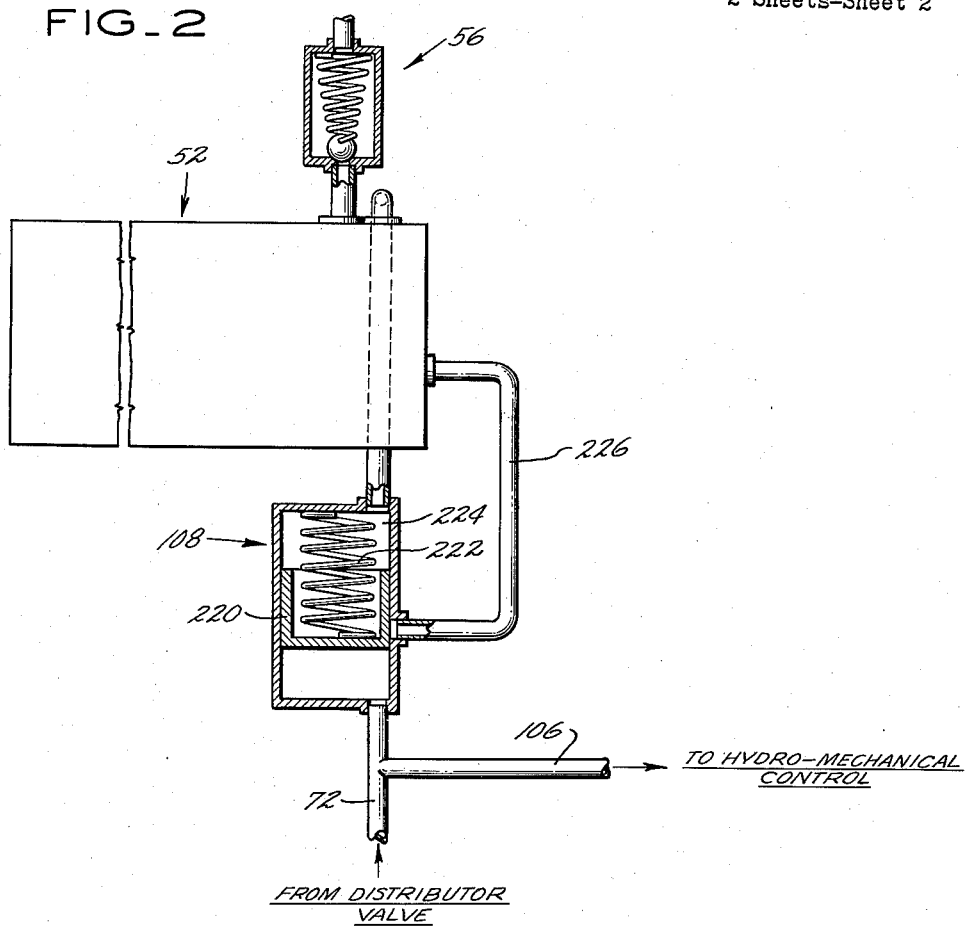
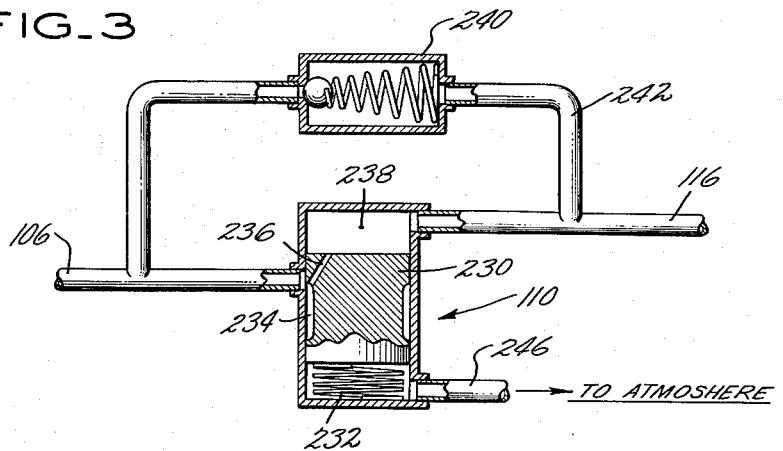
INVENTOR
DONALD RAMAKER
BY *Vernon F. Hauschild*
ATTORNEY 2,990,888
PROPELLER CONTROL APPARATUS
Donald Ramaker, Glastonbury, Conn., assignor to United Aircraft Corporation, East Hartford, Conn., a corporation of Delaware
Filed Dec. 27, 1957, Ser. No. 705,574
7 Claims. (Cl. 170—135.29)

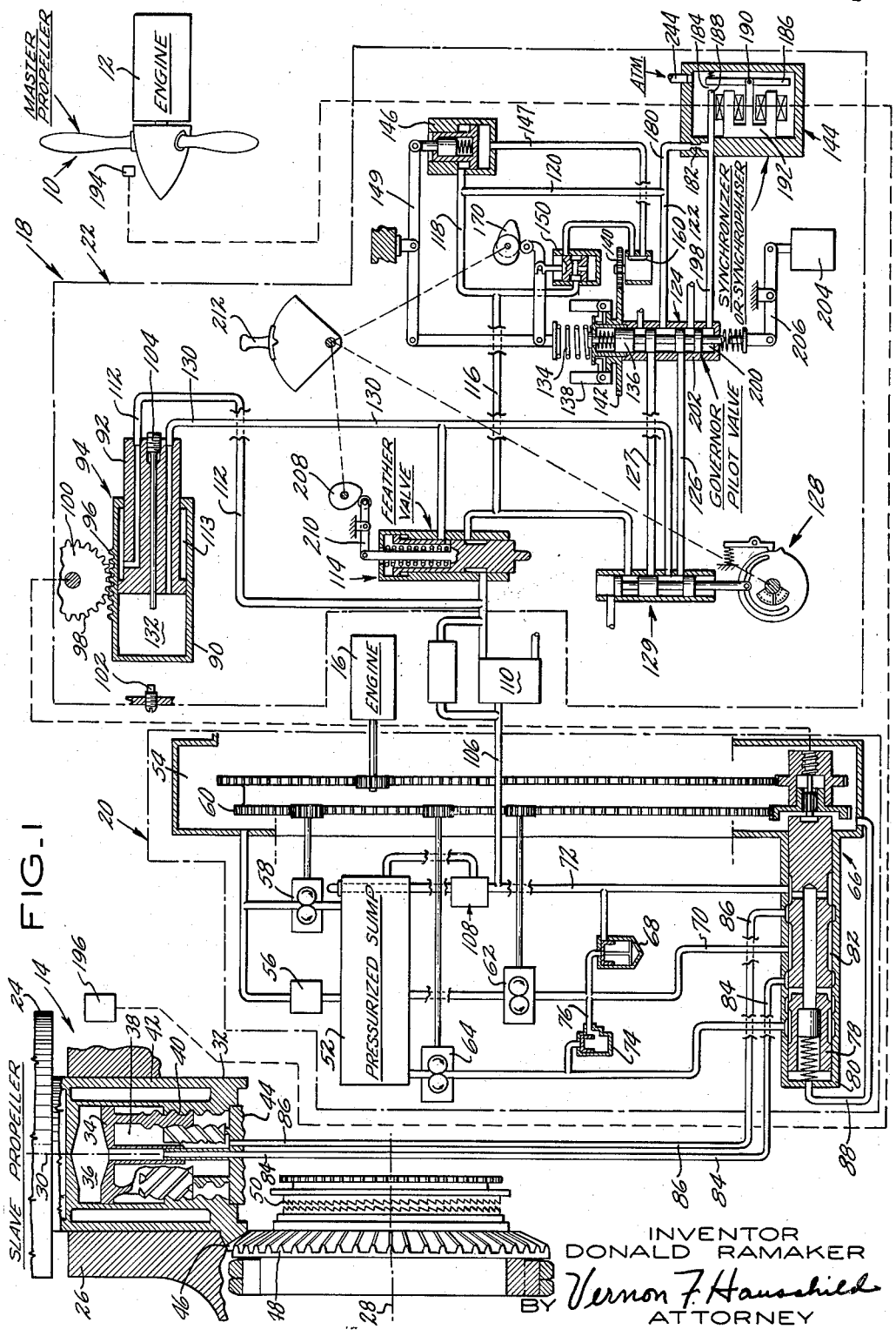

This invention relates to propellers of the aircraft type and more particularly to hydraulic controls to be used therewith to control propeller speed by varying propeller pitch.

It is an object of this invention to provide a speed and pitch control for an aircraft propeller which utilizes a high-flow capacity hydraulic pitch change control and a low-flow capacity hydro-mechanical speed governing control, both of which operate from a single source of hydraulic fluid.

It is a further object of this invention to teach an aircraft propeller hydraulic operated speed and pitch control which utilizes a single source of hydraulic fluid to provide high volume hydraulic actuating fluid flow to the propeller blade pitch angle control to actuate the large volume pitch change motors and to also provide very low volume hydraulic actuating fluid flow at substantially constant pressure to a hydro-mechanical propeller speed control to provide constant metering gain across spool valves and constant pressure drops across orifices in servo systems therein.

It is still a further object of this invention to teach a hydraulic control system for a plurality of aircraft propellers each of which utilizes a single hydraulic actuating fluid propulsion system to provide a high capacity flow of fluid to a propeller blade pitch control system and to also provide a low capacity flow of fluid at very accurate pressures to a hydro-mechanical propeller speed control which includes a governor pilot valve that is positionable as a function of a first propeller speed error and a second propeller speed error, the latter of which is determined by a synchronizer unit utilizing speed measurements from a master and a slave propeller to position a flapper beam with respect to an outlet orifice to form a variable area restriction in an in-series fixed area restriction variable area restriction hydraulic flow system.

It is still a further object of this invention to provide a hydraulic blade pitch and speed control for aircraft propellers which utilizes a single hydraulic actuating fluid system to provide a high capacity flow of actuating fluid to a propeller blade pitch control which has a high capacity pressure regulator unit therein to establish a fluid pressure to be transmitted to a hydro-mechanical propeller speed control through a low flow capacity pressure stabilizer, in-series, that is, in sequential operation with the high capacity pressure regulator, which provides a low flow of accurately pressurized hydraulic actuating fluid to the hydro-mechanical control.

Other features and advantages will be apparent when the following description of my invention is considered in conjunction with the accompanying drawings, in which:

FIG. 1 is a schematic representation of the propeller speed and pitch control system taught herein.

FIG. 2 is an enlarged schematic representation of the high capacity flow pressure regulator used in the blade pitch angle control unit of my control system.

FIG. 3 is an enlarged schematic representation of the in-line low capacity flow pressure stabilizer unit used in conjunction with the FIG. 2 pressure regulator.

Referring to FIG. 1 we see master propeller unit 10 which is operatively connected to and driven by aircraft engine 12 and a slave propeller unit 14 which is operatively connected to and driven by aircraft engine 16 as in a multi-engine aircraft (not shown). Aircraft engines 12 and 16 may be of the well-known type fully described in U.S. Patent Nos. 2,700,946 and 2,711,631. My hydraulically actuated propeller pitch and speed control system is generally indicated at 18 and includes high capacity flow hydraulic blade pitch angle control 20 and a low capacity flow hydro-mechanical propeller speed control 22. The slave propeller 14 comprises a plurality of radially extending and circumferentially equally spaced propeller blades 24 which are supported in position by propeller hub 26 to be rotatable about propeller axis 28, when driven by aircraft engine 16 to perform a thrust generating function, and further to be pivotable within hub 26 about blade axis 30 to vary the pitch and hence the speed of propeller blades 24. Blades 24 are caused to vary in pitch angle by a pitch change motor 32 one of which may be provided for each blade 24 as shown in FIG. 1 or may be of the construction shown in U.S. Patent No. 2,703,148 in which a single pitch change motor is used to actuate all blades. Pitch change motor 32 is of the hydraulic cylinder-piston type and may comprise a movable piston 34 which is caused to translate along axis 30 by the introduction of hydraulic actuating fluid selectively to the opposite sides 36 or 38 thereof. Cooperating splines 40 serve to cause blade shank 42, which forms the cylinder of our pitch change motor 32, to rotate about axis 30 as a result of the translation of piston 34 along axis 30 and due to the coaction of spline unit 40 between stationary member 44 and the hydraulically actuated rotating and translating piston 34, to cause rotation of blade shank 42 and hence propeller blades 24 about axis 30 to effect variations in the propeller blade pitch angles. Blade shank section 42 carries beveled gear 46 in its inner end which coacts with central gear 48 together with comparable shank supported beveled gears of the other propeller blades to insure simultaneous pitch change rotation of each of the propeller blades 24 in a propeller unit 14.

A ratchet type pitch lock 50 is used in known fashion to lock the propeller blades 24 in desired blade pitch angles.

Pitch change control 20 performs the function of selectively providing hydraulic actuating fluid in high flow capacity to the opposite sides 36 and 38 of cylinder 34 of pitch change motor 32. The hydraulic fluid for my overall control system 18 may be considered to originate from the single source, pressurized hydraulic fluid sump 52, which in turn may receive the hydraulic fluid either from a propeller source such as atmospheric sump 54 or from a source (not shown) in aircraft engine 16. Sump pressure relief valve 56 regulates the pressure within pressurized sump 52 and a scavenge pump 58 carries actuating fluid therefrom to atmospheric sump 54. Scavenge pump 58 may be driven as shown by a gear connection to bull gear 60 which is caused to rotate by aircraft engine 16, possibly through a speed reduction gear system (not shown). Utility pump 62 and auxiliary pump 64 are also driven by bull gear 60 and the former serves to provide a high capacity flow of hydraulic actuating fluid from pressurized sump 52 to distributor valve 66 under normal circumstances. High pressure relief valve 68 serves to cause a portion of the hydraulic fluid from utility pump 62 which is passing to distributor valve 66 through line 70 to be returned to pressurized sump 52 through scavenge or return line 72 when the fluid pressure in line 70 exceeds a predetermined limit. When utility pump 62 is inoperative, auxiliary pump 64 may be operated to open check valve 74 and permit hydraulic fluid from sump 52 which is pumped by auxiliary pump 64 to be provided to distributor valve 66 through lines 76 and 70. Distributor valve 66 comprises a spool type of piston 78 which reciprocates and may rotate within a housing or cylinder 80. Depending upon the position of piston 78 within cylinder 80, and this position is determed by hydromechanical control 22 as hereinafter described, the high volume flow of hydraulic actuating fluid which enters distributor valve 66 through line 70 is placed into communication through annulus 82 with either line 84 or line 86. If the high volume flow of actuating fluid enters line 84 it is directed to side 36 of piston 34 in pitch change motor 32 and forces piston 34 downward or toward axis 28 to decrease the pitch of blades 24. When the high volume flow of actuating fluid enters line 86 it is provided to side 38 of piston 34 in pitch change motor 32 thereby moving the piston upwardly or away from axis 28 to increase the pitch of blades 24. Distributor valve 66 is so contoured that when the high volume flow of hydraulic actuating fluid from line 70 is provided to line 84 or line 86, the other of these two lines is placed, at least in part, into communication with line 88 which connects to atmospheric sump 54 or any drain facility.

As mentioned previously, the position of piston 78 within cylinder 80 of distributor valve 66 is determined by hydro-mechanical control 22 and more particularly by the position of movable cylinder 90 with respect to stationary piston 92 of the servo motor 94 in the hydromechanical control unit 22. Servo motor 94 is of the hydraulic cylinder-piston type and movable cylinder 90 carries teeth 96 thereon which engage teeth 98 of gear 100 to cause rotation thereof. Gear 100 is attached to piston 78 of distributor valve 66 and in any convenient fashion, such as rack and pinion arrangement, a spiral spline arrangement or a simple thread arrangement, the rotation of gear 100 causes piston 78 to translate with respect to cylinder 80 and hence determine the operating position and flow distributing characteristics of distributor valve 66. When cylinder 90 is in its far left position it abuts low pitch limit stop 102 and when in its far right position it abuts high pitch limit stop 104. Hydraulic actuating fluid is transmitted to servo motor 94 from two sources, each of which originates from pressurized sump 52. Each of these sources stems from low capacity flow hydraulic connection 106 which is connected to scavenge or return line 72 of pitch change control 20 between distributor valve 66 and high capacity flow pressure regulator valve 108 (to be described hereinafter). The hydraulic fluid in hydraulic connection 106 first passes through low flow capacity pressure stabilizer 110 (to be described hereinafter), and may then pass either through line 112 into cavity 113 of servo motor 94 or may pass through feather valve 114 and lines 116, 118, 120 and 122, thence through governor unit 124 and through lines 126 or 127 and reverse governing switch-over unit 129 into line 130 where it is provided at a variable pressure depending upon the position of governor pilot valve 136 into cavity 132. Hence the two sources of fluid to servo motor 94 are, first, line 112 from pitch control 20 and, second, line 130 from governor unit 124. The force differential acting upon cylinder 90 of servo motor 94 due to the presence of hydraulic fluid at different pressures in cavities 113 and 132 causes cylinder 90 to translate with respect to fixed piston 92 and, as described supra, thereby positions distributor valve 66.

The position of governor pilot valve 136 is determined by two propeller speed errors. Governor speeder spring 134 is positioned to bias pilot valve 136 of governor unit 124 in one direction while counterweights or flyballs 138, which rotate on platform 142 which is driven through gear 140 as a function of propeller speed, are actuatable in response to propeller overspeed to move pilot valve 136 of governor unit 124 in the direction opposite to the urging of speeder spring 134. At selected propeller speed, speeder spring 134 and flyballs 138 are in balance. When the propeller overspeeds, flyballs 138 overcome speeder spring 134 to move piston 136 upwardly which causes cylinder 90 to move to the right and increase the pitch of blades 24 to thereby reduce the speed of propeller 14 to the point determined by the counterbalance of speeder spring 134 and flyweights 138. During periods of propeller underspeed, speeder spring 134 overcomes flyballs 138 to increase propeller speed. By way of pressure regulation, speeder spring 134 and flyweights 138 act in opposition to one another to position pilot valve 136 of governor unit 124 and thereby regulate the pressure drop thereacross so that hydraulic fluid at the proper pressure is provided to chamber 132 of servo motor 94 to maintain the speed of propeller 14 at the desired constant speed.

In the fashion just described, speeder spring 134 and counterweights 138 coact to position governor pilot valve 136 as a function of a first propeller speed error. It will be shown hereinafter how synchronizer 144 serves to bias the position of governor pilot valve 136 as a function of a second propeller speed error.

The desired speed setting of governor unit 124 is established by positioning quadrant lever 212, acting to rotate cam 170 and thereby moving speed setting pilot valve 150. Movement of pilot valve 150 meters oil to speed setting servo 146 through line 147 and motion of this servo acts through linkage 149 to change the compression setting of speeder spring 134. The rate of motion of servo 146, and likewise the rate of change in compression setting of spring 134, are limited by restriction in servo flow as established by chopper valve 160 in series with pilot valve 150. Motion of upper speeder spring seat is transmitted to pilot valve 150 through a cross link pivoted at cam 170, and this motion acts to restore pilot valve 150 to the neutral position existent before quadrant lever 212 was disturbed. Speeder spring motion ceases as pilot valve 150 returns to neutral and governor unit 124 runs at new speed setting established by new balance of flyball and speeder spring forces.

The preceding actuation means for repositioning the speeder spring setting provides a controlled delay found to be required in changing speeds of certain aircraft power plants (turbine engines) to effect a smooth power change without exceeding engine speed limits.

In addition to passing through line 122 to governor unit 124, the hydraulic actuating fluid from line 106 may pass through hydraulic line 180 into synchronizer unit 144. Hydraulic line 180 contains fixed area restriction 182 and variable area restriction 184 in series therein. The area of restriction 184 is determined by the spacing of flapper beam 186 from outlet orifice 188 which is located at the end of hydraulic line 180. Flapper beam 186 is pivotable about pivot point 190 in response to the urging of proportional solenoid 192 which receives a first speed impulse from master propeller speed sensing unit 194 and which receives a second speed impulse from slave propeller speed sensing unit 196 and acts to position flapper beam 186 with respect to orifice outlet 180 such that the reference pressure established in hydraulic line 180 between fixed area orifice 182 and valve area orifice 184 is proportional to the speed error of slave propeller 14 with respect to master propeller 10. The reference pressure thus established in hydraulic line 180 of synchronizer or synchrophaser unit 144 is passed through line 198 into governor pilot valve biasing chamber 200 which is defined between one end of pilot valve 136 of the governor unit 124 and the governor housing 202. Due to the establishment of this reference pressure by synchronizer 144 which is proportional to this second propeller speed error, that is the difference in speed between slave propeller 14 and master propeller 10, which reference pressure is introduced to biasing chamber 200, a second speed error positioning force is applied to governor unit 124. A more complete description of a synchronizer is given in U.S. application Serial No. 555,595, filed December 27, 1955, now U.S. Patent No. 2,878,427, wherein elements 22a, 14, 104 and 14a correspond to elements 192, 194, 186 and 196 hereof, or in U.S. Patent No. 2,752,891, or in abandoned application Serial Number 68,862, filed January 3, 1949, and incorporated by reference in U.S. Patent No. 2,517,703.

A control unit such as 204 may be utilized in connection with linkage mechanism 206 to either apply additional valve positioning or valve movement limiting forces to pilot valve 136 of governor unit 124, as a function of any desired engine or propeller parameter.

Feather valve 114 may be either solenoid operated or operated through cam 208 and linkage mechanism 210 in response to the movement of pilot control lever 212 to block the admission of actuating fluid into line 116 and hence into governor unit 124 so that regulated pressure is no longer provided through line 130 into chamber 132 but continues to be provided to servo mechanism 94 only through line 112 into chamber 114 to move cylinder 90 to its far right or propeller blade full feather position.

Reverse governing switch-over cam 128 performs the function of repositioning a switch-over valve 129 so as to reverse the metering sense of governor unit 124 when cam 128 is rotated past the detent lug by quadrant lever 212. Thus, motion of cam 128 positions valve 129 to block metering line 126, which was open for governing in the positive-pitch blade angle range, and opens line 127 which passes flow to and from chamber 132 of servo 94 to provide propeller pitch change in the reverse-pitch blade angle range. A propeller overspeed error at governor 124 will now cause pilot valve 136 to meter flow past its upper valve land at line 127 so as to increase pressure in chamber 132 and cause servo cylinder 96 to move to an increased reverse-pitch blade angle direction and decrease engine speed to bring governor 124 back to an on-speed position. An underspeed produces metering action by governor 124 at line 127 to reverse this sequence.

Pressure regulating valve 108 is provided in scavenge or return line 72 of propeller blade pitch angle control 20 and it performs the function of establishing a relatively constant hydraulic fluid pressure supply to hydromechanical control 22 from blade pitch angle control 20 through hydraulic conduit 106. This pressure regulating unit 108 is shown more fully in FIG. 2 to which reference will now be made. Actuating fluid at high flow capacity is returned through line 72 by scavenge pump 58 from distributor valve 66 to pressurized sump 52. Pressure regulator unit 108 is located in line 72 to establish a regulated pressure supply to be fed through hydraulic fluid conduit 106 to the hydro-mechanical control 22. When the pressure in line 72 exceeds a predetermined amount piston 220 is forced in a direction to compress spring 222 and to overcome the force acting in conjunction with spring 222 within chamber 224, which is the pressure from within pressurized sump 52, to permit the entry of hydraulic fluid into by-pass line 226 and thence into pressurized sump 52. The pressure in sump 52 is regulated by pressurized sump relief valve 56. Since the hydraulic actuating fluid forces and pressures required for the proper operation of propeller blade pitch angle control 20 require a high flow hydraulic actuating fluid system to actuate pitch change motors 32, pressure regulating unit 108 must be capable of handling high volume actuating fluid flow. Pressure regulating valve 108 is necessary to the system to satisfy the high flow requirements of blade pitch control 20 but it is not sufficiently accurate to provide the degree of pressure stability at low quantity flow required within line 106 for hydro-mechanical control 22 due to its own droop characteristics, and due to the inherent inaccuracy of pressurized sump relief valve 56 and, in installations where a centrifugal head is used, due to variations in fluid pressure caused by propeller speed changes. In the preferred embodiment illustrated herein, the pressure of the hydraulic fluid provided to pitch change motors 32 is preferably greater than the pressure of the actuating fluid provided to hydromechanical control 22 but such need not be the case in other embodiments.

To provide a small quantity flow of hydraulic actuating fluid having accurate pressure stability through line 106 to hydro-mechanical control 22, pressure stabilizing unit 110 is placed in line 106 to be, in effect, in series with pressure regulator unit 108 so that the hydraulic fluid passing through line 106, as shown in FIG. 3, is metered to line 116 through pressure stabilizing unit 110. While the pressure within line 116 acts on the top of piston 230 of unit 110, spring 232 and atmospheric pressure exert a force in an opposite direction so that hydraulic fluid from line 106 is metered through port 234, which is defined by line 106 and piston 230 and is then passed through line 236 into chamber 238 and thence through lines 116, 118, and 120 as a low capacity flow of actuating fluid at a highly stable and substantially constant pressure to governor unit 124 and synchronizer 144. We desire to provide constant pressure fluid to governor unit 124 to effect constant metering gain thereacross and through hydraulic lines 180 of synchronizer 144 to the upstream side of fixed area restriction 182 to keep the pressure drop thereacross constant for a given position of synchronizer flapper beam 186 to insure the accurate establishment of a reference pressure between orifices 182 and 184 which is proportional to the aforementioned second propeller speed error.

Again referring to FIG. 3, it will be noted that safety by-pass valve 240 is positioned in by-pass line 242 so that, should pressure stabilizer 110 malfunction, hydraulic fluid, at a pressure regulated by pressure regulating unit 108, will pass from blade pitch control 20 to hydromechanical control 22 by by-passing pressure stabilizer 110 in passing through safety by-pass valve 240 and by-pass line 242. It will be noted that both synchronizer 144 through line 244 and pressure stabilizer unit 110 through line 246 have a reference pressure of atmosphere.

It is to be understood that the invention is not limited to the specific embodiment herein illustrated and described but may be used in other ways without departure from its spirit as defined by the following claims.

I claim:

1. A master propeller and at least one variable pitch slave propeller having blades rotatable about an axis, at least one hydraulically actuated pitch change motor adapted to vary slave propeller blade pitch, a distributor valve connected to and positionable to selectively provide hydraulic actuating fluid to said pitch change motor, a hydraulically actuated servo motor unit connected to and positioning said distributor valve, a pilot valve connected to regulate the flow of hydraulic actuating fluid to said servo motor unit, a slave propeller speed synchronizer comprising a hydraulic line having a fixed restriction and a variable restriction in series with said variable restriction being formed by an outlet orifice in said hydraulic line and a flapper beam which is positionable with respect to said outlet orifice as a function of slave propeller speed error from master propeller speed and having a hydraulic connecting line extending from between said restrictions and said pilot valve, a source of actuating fluid, a high volume flow fluid propulsion system providing hydraulic fluid from said source in high volume flow through said distributor valve to said pitch change motor, a low flow hydraulic connection between and hydraulically connected to said high flow system and said synchronizer hydraulic line, a high volume flow capacity pressure regulator located in said high flow system and positioned to regulate the pressure entering said hydraulic connection from said high flow volume system, a low flow pressure stabilizer located in said hydraulic connection to stabilize the pressure of the hydraulic fluid introduced to said stabilizer hydraulic line to establish a reference pressure between said restrictions which is a function of said slave propeller speed error and position said pilot valve as a function of said reference pressure.

2. In a variable pitch propeller having blades rotatable about an axis, at least one hydraulically actuated pitch change motor to vary propeller blade pitch, a distributor valve connected to said pitch change motor and positionable to selectively provide hydraulic actuating fluid thereto, a hydraulically actuated servo motor unit connected to and positioning said distributor valve, propeller speed governor means including a first propeller speed error sensing means positioning a governor pilot valve to regulate the flow of hydraulic actuating fluid to said servo motor unit, a propeller speed synchronizer comprising a hydraulic line having a fixed area restriction and a variable area restriction in series therein with said variable area restriction being formed by an outlet orifice in said hydraulic line and a flapper beam positionable with respect to said outlet orifice as a function of a second propeller speed error and having a hydraulic connecting line extending from between and connected to said restrictions and said pilot valve, a source of actuating fluid, a high flow fluid propulsion system providing hydraulic fluid from said source in high flow through said distributor valve to said pitch change motor, a low flow hydraulic connection in said high flow system and connected to said governor pilot valve and said synchronizer hydraulic line, a high flow pressure regulator located in said high flow system and positioned to regulate the pressure entering said hydraulic connection from said high flow system, a low flow pressure stabilizer located in said hydraulic connection to stabilize the pressure of the hydraulic fluid introduced to said governor pilot valve to effect constant metering gain thereacross and to said synchronizer hydraulic line to establish a reference pressure between said restrictions which is a function of said second propeller speed error and to introduce said reference pressure to said pilot valve through said hydraulic connecting line as a biasing force so that said pilot valve is positioned as a function of said propeller speed errors.

3. In a variable pitch propeller having an axis, a plurality of propeller blades, having a radial axis, a hub shaped to support said blades to be rotatable about said propeller axis to effect thrust generation and to be pivotable with respect to said hub and about said blade axis to effect changes in blade pitch angle, a high flow hydraulic pitch change control connected to cause said blades to change pitch including at least one hydraulic cylinder-piston unit operatively connected to said hub and to at least one of said blades, a distributor valve located in said pitch change control and positionable to selectively distribute hydraulic fluid to a first side of said cylinder-piston unit to cause blade pitch increase and to a second side of said cylinder-piston unit to cause blade pitch decrease, a low flow hydro-mechanical propeller speed control operable to selectively position said distributor valve and having a hydraulic cylinder-piston combination connected to and positioning said distributor valve and further having a governor pilot valve connected to hydraulically actuate said cylinder-piston combination, means connected to and biasing said governor pilot valve, means providing a high flow of actuating fluid from a source of actuating fluid, said source connected to said distribution valve for selective distribution of a portion thereof to said cylinder-piston unit and returning the remainder thereof through a return conduit to said source, high flow pressure regulating means located in said return conduit to regulate the pressure of said hydraulic fluid in said return conduit in the area between said distributor valve and said high flow pressure regulating means, a hydraulic connection between and hydraulically connected to said hydraulic pitch change control and said hydro-mechanical control commencing between and hydraulically connected to said distributor valve and said first pressure regulating means and carrying a comparatively small quantity of the pressure regulating fluid therein to said hydro-mechanical control, and low flow in-line pressure stabilizing means located in and regulating the flow through said hydraulic connection to provide a low flow of accurately pressure stabilized actuating fluid to said hydro-mechanical control.

4. In a variable pitch propeller having an axis and adapted to be used as a slave propeller with a master propeller, a plurality of radially extending propeller blades, a hub shaped to support said blades to be rotatable about said axis to effect thrust generation and to be pivotable with respect to said hub to effect changes of blade pitch angle, a high flow hydraulic propeller blade pitch change control having a high flow system to cause said blades to change pitch including at least one hydraulic motor unit operatively connected to said hub and to at least one of said blades, a distributor valve located in said pitch change control and positionable to selectively distribute hydraulic fluid to a first side of said motor unit to cause blade pitch increase and to a second side of said motor unit to cause blade pitch decrease, a low flow hydro-mechanical propeller speed control operable to selectively position said distributor valve and having a hydraulic servo motor connected to and positioning said distributor valve and further having a governor pilot valve which is positioned as a function of a first propeller speed error and which is connected to hydraulically actuate said servo motor combination, and further having a synchronizer adapted to sense speed error between said propeller adapted as a slave propeller to a master propeller and comprising a hydraulic line including a fixed restriction and a variable restriction comprising a nozzle discharging fluid against a flapper beam which is positioned as a function of a second propeller speed error and having a hydraulic connecting line extending from between said restrictions to said governor pilot valve, a source of actuating fluid, means providing a high flow of actuating fluid from said source to said distribution valve for selective distribution of a portion thereof to said motor unit and returning the remainder thereof through a return conduit to said source, high flow pressure regulating means located in said return conduit to regulate the pressure of said hydraulic fluid in said return conduit in the area between said distributor valve and said high flow pressure regulating means, a hydraulic connection between and hydraulically connected to said hydraulic pitch change control and said hydro-mechanical control commencing between and hydraulically connected to said distributor valve and said first pressure regulating means and carrying a comparatively small quantity of the pressure regulated fluid therein to said governor pilot valve and said synchronizer and low flow in-line pressure stabilizing means located in and regulating the flow through said hydraulic connection to provide a low flow of accurately pressure stabilized actuating fluid to said governor pilot valve to effect constant gain thereacross and to said synchronizer to establish a reference pressure between said restrictions and providing said reference pressure as a biasing force to said governor pilot valve so that said governor pilot valve, said servo motor, said distributor valve, and said hydraulic motor unit cooperate to vary propeller blade pitch angle as a function of said first and second errors.

5. In a variable pitch propeller having blades rotatable about an axis, at least one hydraulically actuated pitch change motor hydraulically connected to vary propeller blade pitch, a distributor valve hydraulically connected to said pitch change motor and positionable to selectively provide hydraulic actuating fluid thereto, a hydraulically actuated servo piston-cylinder unit connected to and positioning said distributor valve, propeller speed governor means including propeller speed error sensing means connected to and positioning a governor pilot valve to regulate the flow of hydraulic actuating fluid to said servo piston-cylinder unit, a high flow fluid propulsion system providing hydraulic fluid through said distributor valve to said pitch change motor, a low flow hydraulic connection between and hydraulically connected to said high flow system and said governor pilot valve, a high flow capacity pressure regulator located in said high flow system and positioned to regulate the pressure entering said hydraulic connection from said high flow system, a low flow pressure stabilizer located in said hydraulic connection to stabilize the pressure of the hydraulic fluid introduced to said governor pilot valve to effect constant metering gain thereacross.

6. In a variable pitch propeller having blades rotatable about an axis and adapted to be used as a slave propeller with a master propeller, at least one hydraulically actuated pitch change motor to vary propeller blade pitch, a distributor valve connected to said pitch change motor and positionable to selectively provide hydraulic actuating fluid thereto, a hydraulically actuated servo motor unit connected to and positioning said distributor valve, a pilot valve hydraulically connected to regulate the flow of hydraulic actuating fluid to said servo motor unit, a propeller speed synchronizer adapted to sense speed error between said propeller adapted as a slave propeller to a master propeller and comprising a hydraulic line having a fixed restriction and a variable restriction in series with said variable restriction being formed by an outlet orifice in said hydraulic line and a flapper beam which is positionable with respect to said outlet orifice as a function of propeller speed error and having a hydraulic connecting line extending from between and hydraulically connected to said restrictions and said pilot valve, a source of hydraulic fluid, a high flow fluid propulsion system providing hydraulic fluid from said source and through said distributor valve to said pitch change motor, a low flow hydraulic connection between and hydraulically connected to said high flow system and said synchronizer hydraulic line, a high flow capacity pressure regulator located in said high flow system and positioned to regulate the pressure entering said hydraulic connection from said high flow system, a low flow pressure stabilizer located in said hydraulic connection to stabilize the pressure of the hydraulic fluid introduced to said stabilizer hydraulic line to establish a reference pressure between said restrictions which is a function of said propeller speed error and position said pilot valve as a function of said reference pressure.

7. In a variable pitch propeller having blades rotatable about an axis, at least one hydraulically actuated pitch change motor to vary propeller blade pitch, a distributor valve connected to said pitch change motor and positionable to selectively provide hydraulic actuating fluid thereto, a hydraulically actuated servo motor unit connected to and positioning said distributor valve, propeller speed governor means including a first propeller speed error sensing means comprising a governor pilot valve of the spool valve type and positionable by the resultant force of a speeder spring biasing said valve in a first direction and flyweights which apply a force to said valve opposite to said speeder spring when propeller speed exceeds a preselected limit so that said resultant force positions said valve within a housing, to thereby regulate the flow of hydraulic actuating fluid to said servo motor unit, a biasing chamber located at the anti-speeder spring end of said housing and defined by said housing and pilot valve, a propeller speed synchronizer comprising a hydraulic line having a fixed area restriction and a variable area restriction in series therein with said variable area restriction being formed by an outlet orifice in said hydraulic line and a flapper beam positionable with respect to said outlet orifice as a function of a second propeller speed error and having a hydraulic connecting line extending from between and connected to said restrictions and said biasing chamber, a source of hydraulic fluid, a high flow fluid propulsion system providing hydraulic fluid from said source through said distributor valve to said pitch change motor, a low flow hydraulic connection between and connected to said high flow system to said governor pilot valve and said synchronizer hydraulic line, a high flow capacity pressure regulator located in said high flow system and positioned to regulate the pressure entering said hydraulic connection from said high flow system, a low flow pressure stabilizer located in said hydraulic connection to stabilize the pressure of the hydraulic fluid introduced to said governor pilot valve to effect constant metering gain thereacross and to said synchronizer hydraulic line to establish a reference pressure between said restrictions which is a function of said second propeller speed error and to introduce said reference pressure to said biasing chamber through said hydraulic connecting line as a biasing force so that said pilot valve is positioned as a function of said propeller speed errors.

References Cited in the file of this patent
UNITED STATES PATENTS

| | | |
|---|---|---|
| 2,260,469 | Martin | Oct. 28, 1941 |
| 2,374,276 | French | Apr. 24, 1945 |
| 2,413,439 | Drake | Dec. 31, 1946 |
| 2,513,660 | Martin | July 4, 1950 |
| 2,612,956 | Banning | Oct. 7, 1952 |
| 2,623,600 | Rhines | Dec. 30, 1952 |
| 2,632,516 | Longfellow | Mar. 24, 1953 |